United States Patent [19]

Nishiberi

[11] Patent Number: 5,185,676
[45] Date of Patent: Feb. 9, 1993

[54] BEAM SCANNING APPARATUS AND APPARATUS FOR WRITING IMAGE INFORMATION

[75] Inventor: Nozomu Nishiberi, Higashikurume, Japan

[73] Assignee: Canon Kabushiki Kaisha, Tokyo, Japan

[21] Appl. No.: 912,673

[22] Filed: Jul. 14, 1992

Related U.S. Application Data

[63] Continuation of Ser. No. 588,815, Sep. 27, 1990, abandoned.

[30] Foreign Application Priority Data

Sep. 27, 1989 [JP] Japan .................. 1-251281

[51] Int. Cl.⁵ .............................. G02B 26/08
[52] U.S. Cl. ........................... 359/202; 359/196; 359/213; 250/236; 356/152
[58] Field of Search ............. 359/196, 201, 202, 213, 359/214, 221, 216, 217; 356/152; 250/234, 235, 236

[56] References Cited

U.S. PATENT DOCUMENTS

| | | | |
|---|---|---|---|
| 3,614,212 | 10/1971 | Hock | 359/202 |
| 4,283,145 | 8/1981 | Miyazawa | 359/201 |
| 4,318,582 | 3/1982 | Minoura et al. | 359/217 |
| 4,321,700 | 3/1982 | Russell | 359/216 |
| 4,829,339 | 5/1989 | Dwyer | 355/20 |
| 4,841,137 | 6/1989 | Mochizuki et al. | 250/236 |
| 4,878,202 | 10/1989 | Slob | 365/183 |

FOREIGN PATENT DOCUMENTS

| | | |
|---|---|---|
| 551136 | 8/1984 | Australia . |
| 3722085 | 2/1988 | Fed. Rep. of Germany . |
| 1090417 | 4/1989 | Japan . |

*Primary Examiner*—Loha Ben
*Attorney, Agent, or Firm*—Fitzpatrick, Cella, Harper & Scinto

[57] ABSTRACT

A beam scanning apparatus for scanning light beam on a scanning surface, has a deflector, a scanning mechanism, a detector and a controller. The deflector deflects the light beam so as to guide it to the scanning surface. The scanning mechanism functions to change at least one of a deflection angle and a deflection position of the deflector so that the light beam is scanned on the scanning surface. The detector detects the scanning state of the light beam by the scanning mechanism on the scanning surface by receiving the light beam from the deflector. The controller corrects at least one of the deflection angle and the deflection position of the deflector on the basis of the detection result of the detector.

25 Claims, 3 Drawing Sheets

BEAM SCANNING APPARATUS AND APPARATUS FOR WRITING IMAGE INFORMATION

This application is a continuation of application Ser. No. 07/588,815 filed Sep. 27, 1990, now abandoned.

BACKGROUND OF THE INVENTION

The present invention relates to a beam scanning apparatus, more specifically, to a laser beam scanning apparatus in which, for example, a scanning surface arranged with elements for recording image is scanned with a light beam emitted from a laser and information concerning the position at which the laser beam is applied on the scanning surface is precisely detected during image information recording, whereby the scanning on the scanning surface is realized with high precision.

Heretofore, there have been proposed various laser scanning apparatus in which a laser beam is deflected by a galvanometer or the like so as to be directed to a scanning surface on which elements for image recording are arranged, and image information such as characters or pictures, etc is recorded. This type of the apparatus is widely used for such apparatuses as a liquid crystal display, a laser marker and a laser trimmer that can write image information on the liquid crystal, metal plate or the like.

FIG. 1 schematically shows the main components of a galvanometer used as a deflector in conventional laser beam scanners to control the deflection of a laser beam.

In FIG. 1, the reference numeral 8 indicates a mirror fixed to a rotation shaft 9. An electric motor 10 rotates the shaft 9 at a constant speed. A spring 11, used to cause a rotating force in the reverse direction to the rotational direction of the shaft 9, is attached at one end to the shaft 9 and at the other end to the case 13.

A capacitance sensor 12, attached to the shaft 9 at its part to obtain information for the rotation of the shaft 9, detects the rotational angle of the shaft.

In FIG. 1, light beam incident on the mirror 8 from a laser (not shown) is deflected by oscillating the mirror 8 so as to scan the scanning surface. At this time, the rotation angle of the mirror is detected by the capacitance sensor 12 so as to control to drive the rotating state of the electric motor 10, and thus control the scanning state of the scanning surface.

In the conventional laser scanner shown in FIG. 1, however, there have arisen problems if scanning is attempted by rapid deflection of the laser beam.

(a) Rapid acceleration or deceleration causes a distortion of the rotation shaft. As a result, an error occurs between the rotation angle of the mirror and the rotation angle to be detected by the capacitance. Accordingly, it is hard to obtain accurate positional information of the applied position of the laser beam on the scanning surface.

(b) If an attempt is made to lessen the moment of inertia of the rotating parts so as to improve the response characteristic, limitation will have to be imposed when attaching the capacitance sensor.

SUMMARY OF THE INVENTION

In view of the above drawbacks in the conventional apparatus, an object of the present invention is to provide a light beam scanning apparatus capable of more accurately controlling the state of the applied position of light beam on a scanning surface and to an image information writing apparatus employing such the scanning apparatus.

The other objects of the present invention will be made apparent from the detailed description of the embodiment described later.

DETAILED DESCRIPTION OF THE PREFERRED EMBODIMENTS

A laser scanning apparatus explained below as an example of the present invention functions as follows. In a laser scanning apparatus, a light beam from a light source is reflected by at least one beam deflecting means and is directed to a scanning surface. A beam splitter is placed between the beam deflecting means and the scanning surface. With the beam splitter a part of the light beam from the beam deflecting means is perpendicularly split to an optical path from the deflecting means when the deflecting means is in the reference state. One of these beams is guided to an optical detection means to control the deflecting angle of the deflecting means by control means by the use of the output from the optical detection means.

Figure 1:
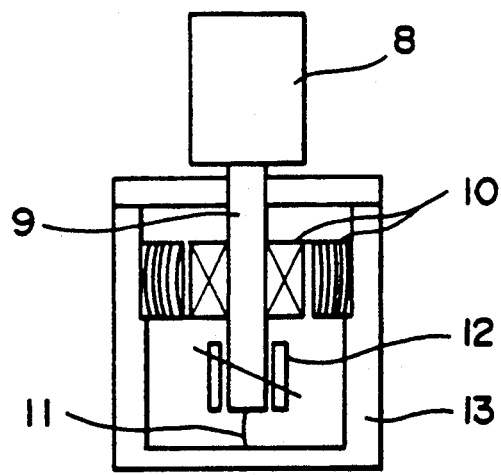
FIG. 1 is a schematic diagram of a conventional optical deflector.
Figure 2:
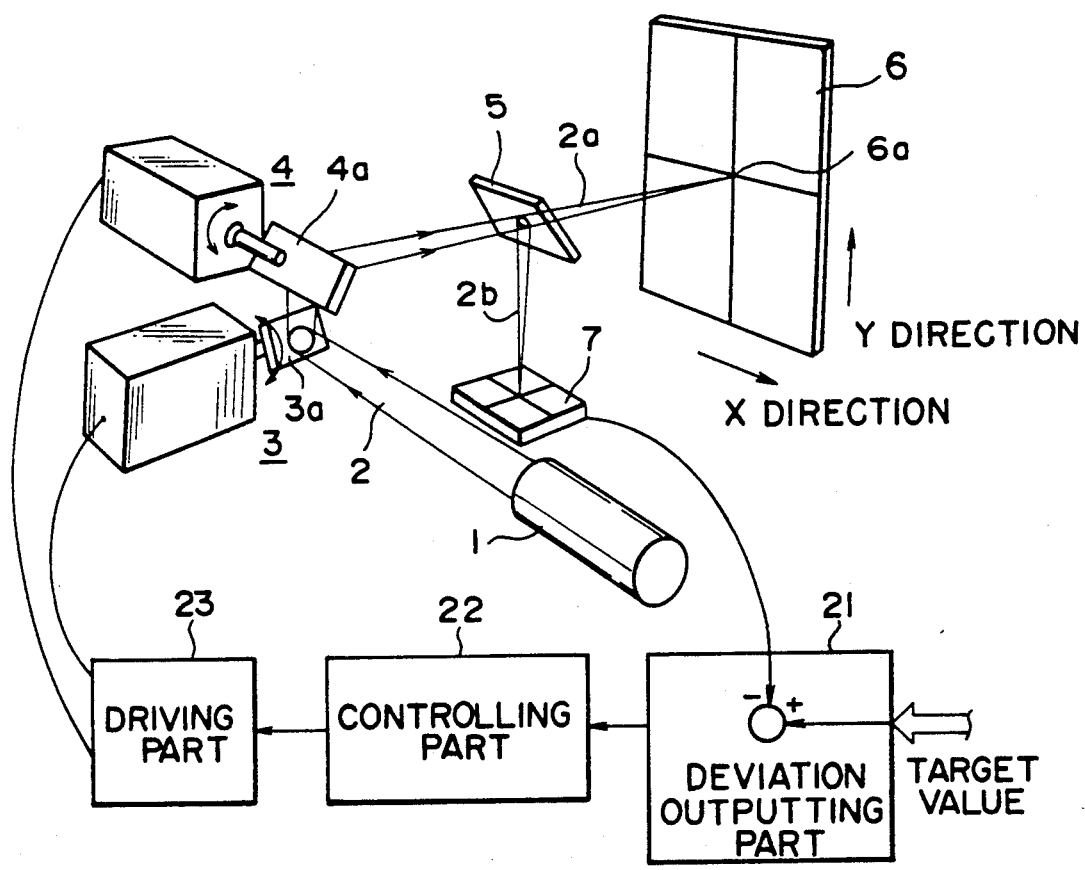
FIG. 2 is a schematic diagram illustrating main parts of an image information writing apparatus according to the first embodiment of the present invention.

FIG. 2 outlines the main components of one embodiment according to the present invention.

In this figure, the reference numeral 1 denotes a laser oscillator and the numeral 2 represents the laser beam. An x-axis beam scanning mechanism 3 can be driven by an electric motor (such as a servo motor or galvanometer) with a plane mirror 3a fixed at one end. By oscillating or rotating this mirror 3a (in this embodiment by rotating the mirror around its supporting shaft), laser beam 2 is reflected and deflected to scan on a scanning surface 6 described later in the X direction. A Y-axis beam scanning mechanism 4 can be driven by an electric motor (such as a servo motor or galvanometer in this embodiment) as a driving means with a plane mirror 4a fixed at one end. By oscillating or rotating this mirror 4a (by rotating the mirror 4a around its supporting shaft in this embodiment), the laser beam 2 deflected by the Y-axis beam scanning mechanism 4 is reflected and deflected to scan on the scanning surface 6 described later in the Y direction.

The reference numeral 5 denotes a beam splitter comprising a half-mirror. It splits the laser beam deflected by the mirror 4a of the Y-axis optical scanning mechanism 4 into two beams, the transmitted beam 2a and the reflected beam 2b. The scanning surface 6 is the object scanned by laser beam 2a to write image information thereon. This embodiment employs a high-polymer liquid crystal capable of thermally writing. An optical detecting means 7 comprising a two-dimensional CCD area sensor detects information of applied position of the laser beam 2b reflected by the beam splitter 5. Thus, the information of applied position of the laser beam on the object can be obtained by detecting the light beam from the mirrors 3a and 4a, so that more accurate control for the applied position is realized.

In the present embodiment, the beam splitter 5 is set so that laser beam 2b is split perpendicularly to the optical path of laser beam 2a coming from the mirror 4a when the mirror surface 3a of the X-axis beam scanning mechanism 3 and the mirror surface 4a of the Y-axis beam scanning mechanism 4 are in the standard state (for example, when the point of incidence of laser beam 2 is set at the center 6a of the scanning surface 6). In other words, when the two split laser beams 2a and 2b are in the standard state, they are set to be perpendicular to each other.

Further, the scanning distance of laser beam 2a on the scanning surface 6 and the scanning distance of laser beam 2b on the surface of the optical detecting means 7 are set so as to have similar relationship. In other words, if the optical detecting means 7 is placed in an equivalent position on the transmission beam path from the beam splitter 5, the light receiving surface of the optical detecting means 7 would be parallel to the scanning surface 6 (or the incident angle of the scanning light beam on the light receiving surface of the detecting means is always the same as that on the scanning surface 6). The scanning beam is thus detected actually, so that both an error and information for the optical scanning mechanism to be controlled can be found by just one area sensor.

A deviation outputting part 21 calculates the deviation between the signal output from the optical detecting means 7 and the target value signal input from the outside, and sends this deviation signal to a controlling part 22. The controlling part 22 causes a driving part 23 to be driven on the basis of the signal from the deviation outputting part 21. Based on the signal from the controlling part 22, the driving part 23 adjusts the rotations of the mirror 3a of the X-axis optical scanning mechanism 3 and the mirror 4a of the Y-axis optical scanning mechanism 4, and controls the applied position of the laser beam 2a on the scanning surface 6.

In the above configuration of this embodiment, the laser beam oscillated from the oscillator 1 is reflected and deflected by the mirror 3a of the X-axis beam scanning mechanism 3 and the mirror 4a of the Y-axis beam scanning mechanism 4, and is scanned on both the scanning surface 6 and the surface of the beam detecting means 7 through the beam splitter 5.

The positional relationship between the scanning surface 6 and the surface of the beam detecting means 7 is established beforehand. Hence, by detection of the point of incidence of the laser beam 2b on the surface of the beam detecting means 7, the applied position (scanning position) of laser beam 2a on the scanning surface 6 can be obtained with high accuracy. Then, the deviation between the signal output from the beam detecting means 7 and the target value signal input from the outside is obtained by the deviation outputting part 21 which sends the deviation signal to the controlling part 22.

Then, the controlling part 22 controls the driving part 23 in compliance with the deviation signal from the deviation outputting part 21. From this, the driving part 23 causes the X-axis beam scanning mechanism 3 and the Y-axis beam scanning mechanism 4 to be driven, and thereby controlling the applied position of laser beam 2a on the scanning surface 6.

In the present embodiment, instead of using an electrical motor to make the X-axis and Y-axis beam scanning mechanisms rotate the mirrors, another drive means can be used, such as a piezo-electric element.

Figure 3:
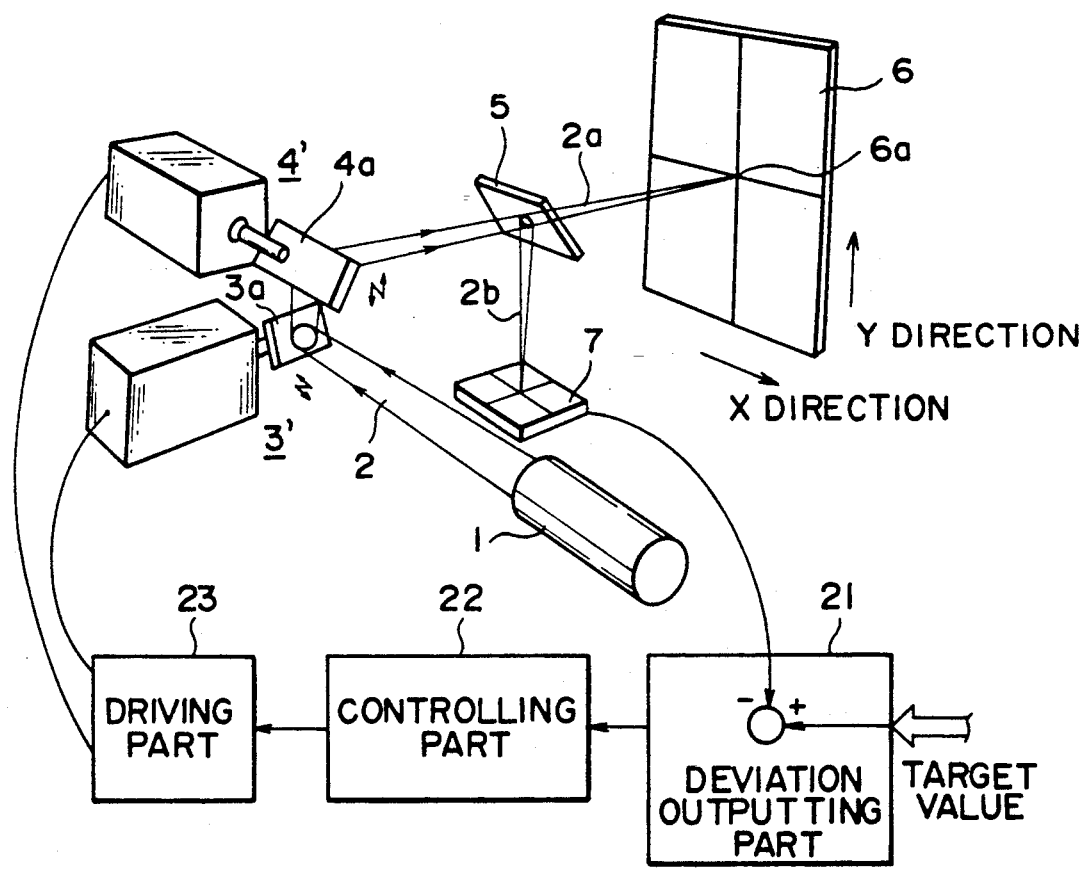
FIG. 3 is a schematic diagram illustrating main parts of an image information writing apparatus according to the second embodiment of the present invention.

Such embodiment is illustrated in FIG. 3. The numbering of the parts in FIG. 3 is the same as for FIG. 2. The numerals 3' and 4' indicate scanning mechanisms for the X-axis and Y-axis scanning mechanisms, respectively. Each scanning mechanism contains a piezo-electric element. These can make mirrors 3a and 4a oscillate without changing the angles of the reflective surfaces. The X-axis beam scanning mechanism 3a oscillates in the X-axis direction, and the Y-axis beam scanning mechanism 4a oscillate in the Y-axis direction. By oscillating the mirrors 3a and 4a to change the deflection (reflection) positions due to the mirrors, the scanning surface 6 can be entirely scanned just as in the previous embodiment. The driving part 23 is set to send a control voltage to the piezo-electric elements of respective beam scanning mechanisms, thus achieving the same control as in the previous embodiment.

Another way to deflect the laser beam may be by using the path of a guided wave, for example.

The above embodiments illustrate a case where the scanning surface is two-dimensionally scanned. But, this invention can also be applied as a laser beam scanning apparatus in which only one optical deflector is used to one-dimensionally scan the scanning surface.

Further, the results obtained in the above embodiments are exactly the same when the scanning surface and the beam detecting means are arranged in reverse.

According to the embodiments described above, the respective element is set as illustrated above to obtain the information of the applied position of laser beam on the scanning surface, so that the information of the applied position of the laser beam can be accurately obtained without suffering from the influences from distortion of the rotating shaft during high-speed rotation of the optical deflector. Further, there is no need for providing a sensor to detect the rotation angle on the optical deflector. Also, the moment of inertia of the rotating portion can be decreased, and the deflection response is improved. In addition, because the signal output from the beam detecting means is proportional to the change in scanned distance for the object such as the scanning surface, the output signal does not have to be compensated.

I claim:

1. A beam scanning apparatus comprising:
    optical deflecting means for deflecting a light beam so as to guide it to a predetermined surface;
    scanning means for changing at least one of a deflection angle and a deflection position of said optical deflecting means so that the light beam is two-dimensionally scanned on said predetermined surface;
    detecting means for detecting a two-dimensional scanning condition of the light beam on said predetermined surface by receiving the light beam from said optical deflecting means; and
    controlling means for correcting at least one of said deflection angle and said deflection position of said optical deflecting means on the basis of a detection result of said detecting means.

2. An apparatus according to claim 1, wherein said scanning means changes the deflection angle of said optical deflecting means.

3. An apparatus according to claim 2, wherein said detecting means includes a beam splitter disposed in the optical path between said optical deflecting means and said predetermined surface, and an optical detector for detecting the beam split by said beam splitter from the beam directed to said predetermined surface.

4. An apparatus according to claim 3, wherein said optical detector detects an incident position of the beam split by said beam splitter, and said controlling means controls the change in said angle of deflection based on said detected incident position.

5. An apparatus according to claim 4, wherein said optical detector has a CCD area sensor.

6. An apparatus according to claim 2, wherein said optical deflecting means has a first mirror and a second mirror.

7. An apparatus according to claim 6, wherein said scanning means includes a first driving means for rotating said first mirror, and a second driving means for rotating said second mirror.

8. An apparatus according to claim 7, wherein the light beam is scanned in a first direction on said predetermined surface by said first mirror being driven by said first driving means and the light beam is scanned in a second direction on said predetermined surface by said second mirror being driven by said second driving means.

9. A beam scanning apparatus comprising:
optical deflecting means including first and second mirrors for deflecting a light beam so as to guide it to a predetermined surface;
scanning means for changing at least one of a deflection angle and a deflection position of said optical deflecting means so that the light beam is scanned on said predetermined surface, said scanning means including a first driving means for rotating said first mirror and a second driving means for rotating said second mirror, wherein the light beam is scanned in a first direction on said predetermined surface by said first mirror being driven by said first driving means and the light beam is scanned in a second direction on said predetermined surface by said second mirror being driven by said second driving means;
detecting means for detecting a scanning condition of the light beam on said predetermined surface by receiving the light beam from said optical deflecting means, said detecting means including a beam splitter disposed in the optical path between said first and second mirrors and said predetermined surface, and an optical detector for detecting the beam split by said beam splitter from the beam directed to said predetermined surface; and
controlling means for correcting at least one of said deflection angle and said deflection position of said optical deflecting means on the basis of a detection result of said detecting means.

10. An apparatus according to claim 9, wherein said optical detector includes a sensor for two-dimensionally detecting an incident position of said split beam.

11. An image information writing apparatus, comprising:
optical deflecting means for deflecting a light beam so as to guide it to a surface of an object to be scanned for writing image information thereon;
scanning means for changing at least one of a deflection angle and a deflection position of said optical deflecting means so that the light beam is two-dimensionally scanned on said object;
detecting means for detecting a two-dimensional scanning condition of the beam on said object by receiving the light beam from said optical deflecting means; and
controlling means for correcting at least one of said deflection angle and said deflection position of said optical deflecting means based on a detection result of said detecting means.

12. An apparatus according to claim 11, wherein said scanning means changes the deflection angle of said optical deflecting means.

13. An image information writing apparatus, comprising:
optical deflecting means for deflecting a light beam so as to guide it to a surface of a high-polymer liquid crystal for writing image information thereon;
scanning means for changing a deflection angle of said optical deflecting means so that the light beam is scanned on said object;
detecting means for detecting a scanning condition of the beam on said object by receiving the light beam from said optical deflecting means; and
controlling means for correcting said deflection angle of said optical deflecting means based on a detection result of said detecting means.

14. An image information writing apparatus, comprising:
optical deflecting means for deflection a light beam so as to guide it to a surface of an object to be scanned for writing image information thereon;
scanning means for changing a deflection angle of said optical deflecting means so that the light beam is two-dimensionally scanned on said object;
detecting means for detecting a scanning condition of the beam on said object by receiving the light beam from said optical deflecting means; and
controlling means for correcting said deflection angle of said optical deflecting means based on a detection result of said detecting means.

15. A beam scanning apparatus comprising:
a mirror optical system for deflecting a light beam so as to guide it to a predetermined surface;
an electric motor for changing a reflection angle of the light beam on said mirror optical system so that the light beam is two-dimensionally scanned on said predetermined surface;
a sensor for detecting a two-dimensional scanning condition of the beam on said predetermined surface by receiving the light beam from said mirror optical system; and
a controller for correcting said beam reflection angle of said mirror optical system based on a detection of said sensor.

16. A beam scanning apparatus comprising:
first and second optical deflecting means for deflecting a light beam so as to guide it to a predetermined surface;
first scanning means for changing at least one of a deflection angle and a deflection position of said first optical deflecting means so that the light beam is scanned in a first direction on said predetermined surface;
second scanning means for changing at least one of a deflection angle and a deflection position of said second optical deflecting means so that the light beam is scanned on said predetermined surface in a second direction intersecting said first direction;
detecting means for detecting a two-dimensional scanning condition of the light beam on said predetermined surface by receiving the light beam deflected by said first and second optical deflecting means; and controlling means for correcting at least one of said deflection angle and said deflection position of said first optical deflecting means and for correcting at least one of said deflection angle and said deflection position of said second optical deflecting means, on the basis of a detection result of said detecting means.

17. An apparatus according to claim 16, wherein said detecting means includes a beam splitter disposed in the optical path between said first and second optical deflecting means and said predetermined surface, and an optical detector for detecting the light beam split by said beam splitter from the base directed to said predetermined surface.

18. An apparatus according to claim 17, wherein said optical detector includes a sensor for two-dimensionally detecting an incident position of said split beam.

19. An apparatus according to claim 18, wherein each of said first and second optical deflecting means includes a plane mirror.

20. An image information writing apparatus, comprising:

first and second optical deflecting means for deflecting a light beam so as to guide it to an object to be scanned for writing image information thereon;

first scanning means for changing at least one of a deflection angle and a deflection position of said first optical deflecting means so that the light beam is scanned in a first direction on said object;

second scanning means for changing at least one of a deflection angle and a deflection position of said second optical deflecting means so that the light beam is scanned on said object in a second direction intersecting said first direction;

detecting means for detecting a two-dimensional scanning condition of the light beam on said object by receiving the light beam deflected by said first and second optical deflecting means; and controlling means for correcting at least one of said deflection angle and said deflection position of said first optical deflecting means and for correcting at least one of said deflection angle and said deflection position of said second optical deflecting means, on the basis of a detection result of said detecting means.

21. A beam illumination apparatus comprising:

optical deflecting means for deflecting a light beam so as to guide it to a predetermined surface;

light position changing means for changing at least one of a deflection angle and a deflection position of said optical deflecting means so that an incident position of the light beam is two-dimensionally changed on said predetermined surface;

detecting means for two-dimensionally detecting an incident position of the light beam on said predetermined surface by receiving the light beam from said optical deflecting means; and controlling means for correcting at least one of said deflection angle and said deflection position of said optical deflecting means on the basis of a detection result of said detecting means.

22. An apparatus according to claim 21, wherein said detecting means includes a beam splitter disposed in the optical path between said optical deflecting means and said predetermined surface, and an optical detector for detecting the beam split by said beam splitter from the beam directed to said predetermined surface.

23. An apparatus according to claim 22, wherein said optical detector detects an incident position of the beam split by said beam splitter, and said controlling means corrects at least one of said deflection angle and said deflection position on the basis of said detected incident position of the beam split by said beam splitter.

24. A control apparatus for controlling a scanning apparatus having an optical deflecting system for deflecting a light beam so as to guide the light beam to a predetermined surface and having an actuator for changing at least one of a deflection angle and a deflection position of said optical deflecting system such that the light beam is two-dimensionally scanned on said predetermined surface, the apparatus comprising:

detecting means for detecting a two-dimensional scanning condition of the light beam on said predetermined surface by receiving the light beam from said optical deflecting system; and controlling means for controlling said actuator to correct at least one of said deflection angle and said deflection position of said optical deflecting system on the basis of a detection result of said detecting means.

25. An apparatus according to claim 24, wherein said detecting means includes a light beam splitter disposed in the optical path between said optical deflecting system and said predetermined surface, and further including an optical area sensor for detecting the light beam split by said light beam splitter of the light beam directed at said predetermined surface.

* * * * *